Jan. 24, 1956　　　　　B. D. LEE　　　　2,732,025
METHOD AND APPARATUS FOR ANALYSIS OF SEISMOGRAPHIC RECORDS
Original Filed Feb. 1, 1950　　　　2 Sheets-Sheet 1
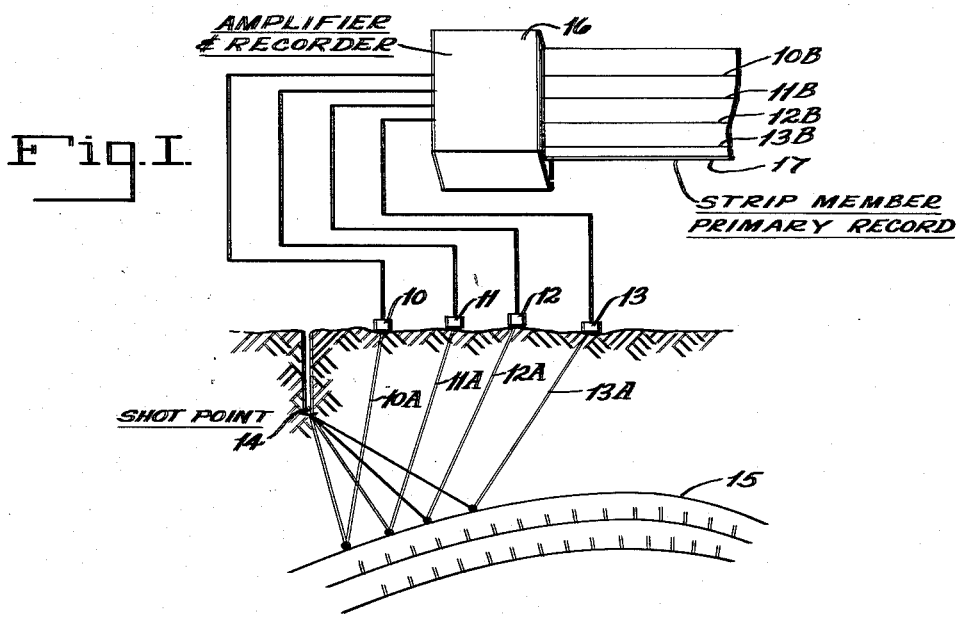
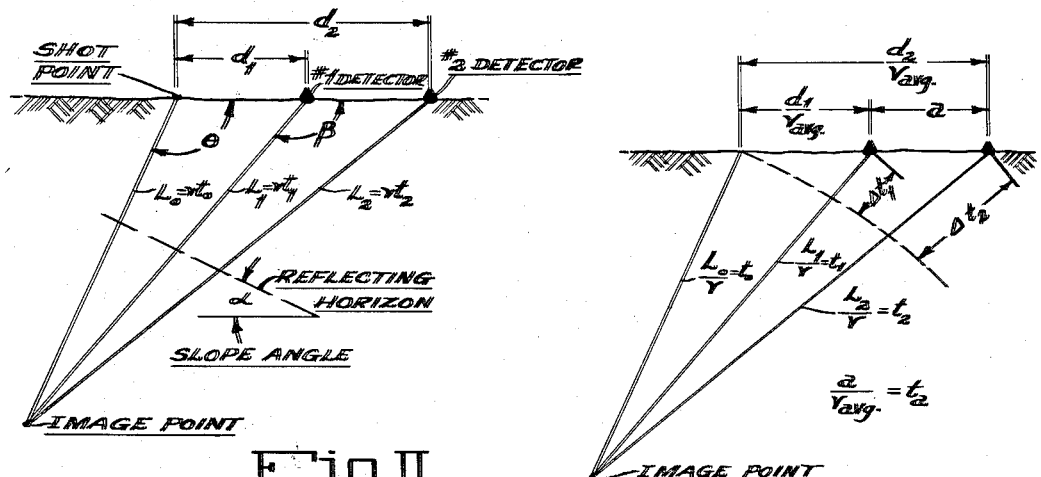
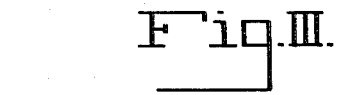
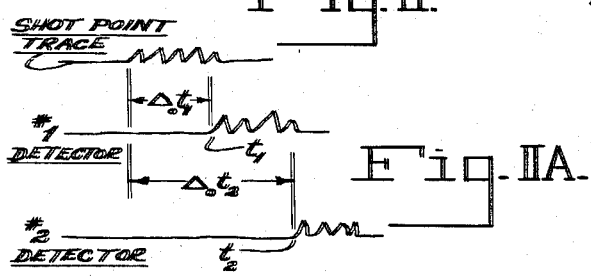
INVENTOR.
BURTON D. LEE
BY Daniel Stryker
J. H. Grehame
ATTORNEYS Jan. 24, 1956 B. D. LEE 2,732,025
METHOD AND APPARATUS FOR ANALYSIS OF SEISMOGRAPHIC RECORDS
Original Filed Feb. 1, 1950 2 Sheets-Sheet 2
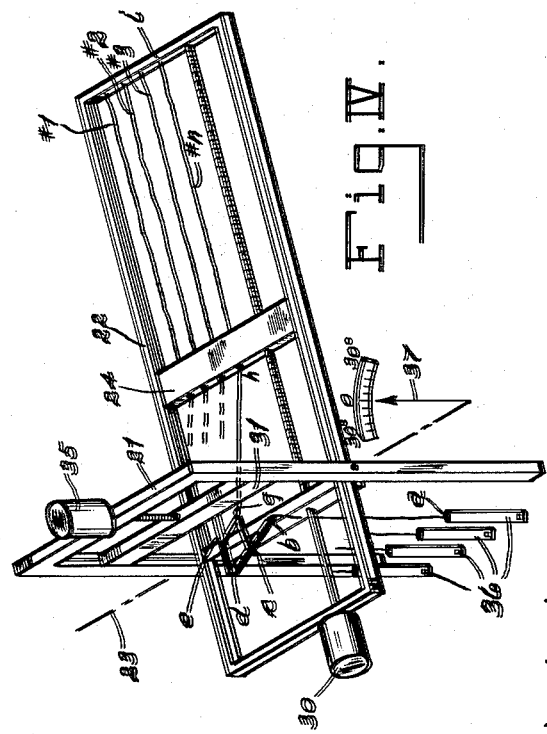
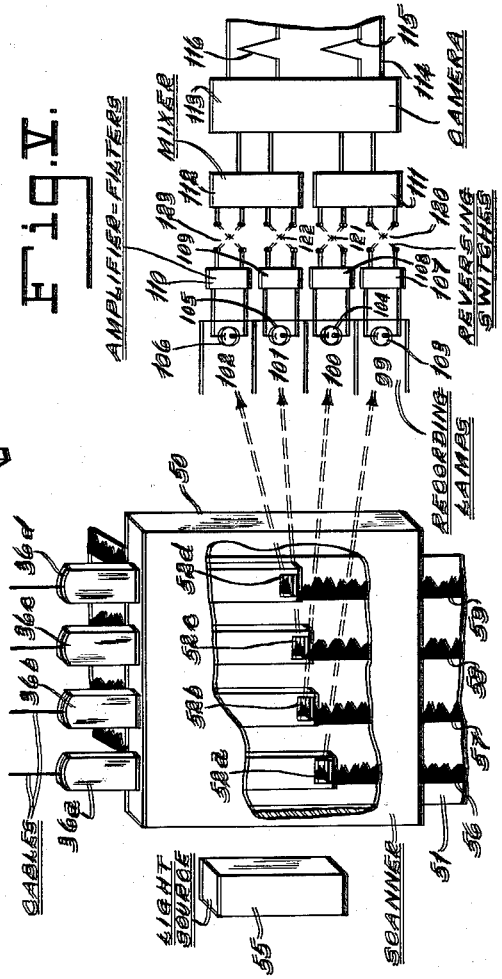
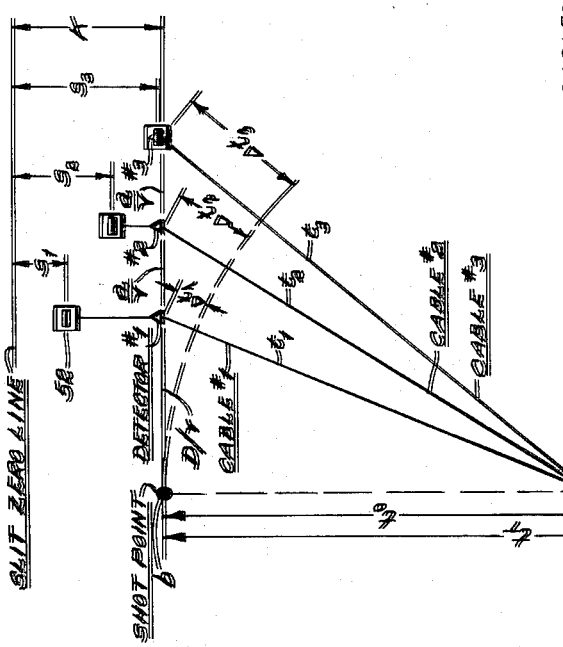
INVENTOR.
BURTON D. LEE
BY Daniel Stryker
J.H. Graham
ATTORNEYS United States Patent Office
2,732,025
Patented Jan. 24, 1956

2,732,025

METHOD AND APPARATUS FOR ANALYSIS OF SEISMOGRAPHIC RECORDS

Burton D. Lee, Houston, Tex., assignor to The Texas Company, New York, N. Y., a corporation of Delaware Continuation of application Serial No. 141,689, February 1, 1950. This application February 26, 1954, Serial No. 412,909

5 Claims. (Cl. 181—.5)

This invention is concerned with seismic prospecting and especially with reflection seismograph practice wherein vibrations are induced in the earth from a shot point, resulting vibrations are detected by seismometers at a plurality of points differently located relative to the shot point and outputs from the seismometers are recorded simultaneously as separate traces side by side on a strip member.

The invention involves reproducing an adjusted wave record from the aforementioned strip member wherein each is individually and continuously adjusted for its phase-time relation with respect to the phase-time of a reference trace obtainable by a seismometer located at or near the surface of the earth above the shot point, whereby the phase-time of the adjusted traces is made to coincide completely or substantially completely with that of the reference trace. More specifically the invention involves continuously computing the time differences and continuously effecting the necessary adjustments during the reproduction.

My application Serial No. 753,541, filed June 9, 1947, for Seismic Prospecting, now U. S. Patent No. 2,638,402, issued on May 12, 1953, which was a copending application with the application of which the present application is a continuation, broadly discloses obtaining a vibration wave record on a strip member and reproducing a secondary record therefrom wherein corrections for time-phase differences are made. As broadly disclosed therein, phase-time differences between original traces usually vary as the original recording period progresses and, therefore, it is necessary to adjust the secondary pick-up positions from time to time during re-recording, either manually or automatically, to assure that there is proper compensation at any instant.

The present application discloses more specifically a method of and means for effecting continuously the aforesaid compensation.

In calculating results from reflection seismic records, it is frequent practice to use the trigonometric formulae governing the wave path diagram shown later in Fig. II. There are some simplifying assumptions involved in the assumption of straight line wave travel paths but such assumptions are, in most cases, acceptable since errors introduced thereby are quite insignificant. It is necessary in the calculation that wave velocity be known and expressible as some function of time of arrival of reflections.

Given the depth and slope angle of a reflecting bed and the average wave velocity it is possible to compute, first, the lengths of the wave travel paths to the various seismometers and, second, the reflection arrival times by dividing path length by velocity. The problem involved in reflection seismic prospecting, however, is the inverse of that just stated. The reflection record furnishes only the reflection arrival times at known distances from the shot point. From this information one may reconstruct the wave path diagram if, again, velocity is known.

As explained in the aforementioned application Serial No. 753,541, filed June 9, 1947, it is frequently desirable to "mix" the output of two or more spaced seismometers in order to accentuate reflections which are of necessity recorded in conjunction with random disturbances and other undesired waves. It is pointed out in the aforementioned application that reflections can best be accentuated when they arrive in time-phase coincidence on the signal channels whose outputs are being "mixed." Usually, such coincidence does not exist. In fact, it is possible that a reflection may arrive on adjacent channels in phase-time opposition with the result that "mixing" obscures rather than accentuates the desired reflection with consequent loss of data which should have been available from the record. If one knew prior to recording a shot that a certain reflection would arrive at the seismometers with a specific time-phase relationship, it would be possible to introduce corrections into the original record so as to achieve the desired coincidence of time-phase and thus accentuate that reflection. Taking such a shot would be futile, however, for if one knows the results beforehand he has already all information to be gained from the shot.

A more fruitful approach to the problem is to record in reproducible form on a common strip member the individual uncompensated outputs of the separate seismometers and later scan this record for all reasonably possible conditions of time-phase relationships. This would be accomplished by repeatedly reproducing the original record with pickup points compensated for the time differences which would exist under successively changing assumptions as to dip of reflecting strata. From this group of records one could more readily recognize reflections which arrive in substantial time-phase coincidence, particularly if "mixing" is used in the reproduction of the record.

If such a procedure is to be carried out in an efficient manner, continuous correction of the pickup points at all times during reproduction of the record is a necessity. It is the purpose of this application to disclose method and means for continuously computing and displaying or effecting the required corrections.

In further description of the invention, reference will be made to the drawings.

Figure I illustrates schematically the production of a seismic record on a strip member.

Figure II is a space diagram showing the relationship between a sound wave moving from the shot point downward in the earth and being reflected from the top of a formation to each of two detectors on the surface of the earth.

Figure IIA illustrates typical seismic waves received at a plurality of spaced detectors.

Figure III is a time diagram illustrating the way in which the space diagram of Figure II can be converted into a diagram whose dimensions are time functions.

Figures IIIA and IV illustrate one embodiment of a mechancal means for continuously computing phase-time differences.

Fgure V illustrates schematically a scanner provided with adjustable slits, the adjustment of which is controlled by the mechanism of Figure IV. In addition, it shows schematically means for reproducing an adjusted wave record on a secondary strip member.

Since times and time differences are the basic data recorded, corrections to these data must be in the nature of time corrections. Wave path diagram, Figure II, however, is a distance diagram which does not readily lend itself to the direct solution of the equations determining these time corrections. Transformation of the wave path diagram to a time diagram, Figure III, by division of all components of Figure II by wave velocity results in a solution of the diagram directly in terms of time and time differences.

It is apparent from Figure III that an analogue computer could be built with the time diagram as its basis. It is to be noted that the transformation from Figure II to Figure III produces a system of triangles in which all sides are variables while only two sides of the triangles of Figure II are variable. Both of the variable sides of Figure II are nonlinear with respect to time unless velocity is constant. The element representing the path of the image point in Figure III is linear with respect to time while the other two sides are nonlinear. The effective detector position of Figure III is proportional to the real distance of the detector from the shot-point, which is a constant, and inversely proportional to velocity which is expressible as a function of time.

Since the purpose of the solution of these diagrams is to obtain the time differences between the various traces and a reference trace at the shot point, the step of subtracting the time of arrival of a reflection at the reference detector from the times of its arrival at the various other detectors must be performed. Figure IIIA shows schematically one form of device (illustrated structurally in Figure IV) which will produce results proportional to time differences between traces, it being understood that the distances $D/v$ and $a/v$ are variable with time and that special means for linking the cables to the slits are required though, for simplicity, not shown.

Referring to Figure I, the numerals 10, 11, 12 and 13 designate seismometers placed in a line on the surface of the earth extending out from a shot point 14. Seismic waves generated at the shot point are reflected from a formation interface 15 below the surface of the ground, say at an interface at which seismic velocities change greatly. Sound waves 10A, 11A, 12A, and 13A are reflected from the horizon and picked up by the respective seismometers. Currents varying in accordance with the variations of the received waves are carried from the individual seismometers to a multiple amplifier and recorder 16 from which a reproducible primary record on a strip member 17 is formed.

Reference is now made to Figure II. As previously mentioned, this diagram shows the relationship between a sound wave moving from the shot point downwardly in the earth and being reflected from the top of a formation to each of two detectors located on the surface of the earth.

As is known, the reflected sound wave appears to come from a point known as the image point which lies as far below the reflecting surface as the shot point above the reflecting surface and located on a normal line from the shot point to the reflecting surface. The distance from the shot point to the image point, $L_0$, is equal to the velocity of the sound, $v$, times the time $t_0$. Likewise, the distance from the image point to the first detector $L_1$, is equal to $vt_1$, and the distance to a second detector, $vt_2$. The distance from the shot point to the first detector is $d_1$ and to the second detector is $d_2$.

As known, sound recording is frequently done with 12 detectors, one at the shot point, the other 11 with regular spacing between each detector.

Figure IIA shows typical traces for detectors 1 and 2 and for a detector at the shot point. It will be noted that the arrival time at the second detector lags the arrival time at the shotpoint detector by an interval $\Delta t_2$.

The objective of this invention is to solve the triangles of the space diagram in Figure II in such a way as to obtain differences in path lengths $L_0, L_1, L_2, \ldots L_n$ and, finally, to convert these differences to time differences which may be used to align the pick-ups of the reproducer so as to eliminate the differences in arrival times which are inherent in conventional records.

Figure III illustrates the way in which the geometric pattern developed in Figure II can be converted into a diagram whose dimensions are time functions. Inasmuch as the average velocity of sound through the earth is a function of time, the time diagram can be developed by simply dividing all sides of the similar triangles in Figure II by the $v_a$. When this is done, the distance from the shot point to the image point and the distances of the reflected sound path to each of the detectors are functions of the time alone and the spacing between detectors is $$\frac{d}{v_a}$$

which is a function depending entirely upon geometrical spacing and the average velocity of sound.

The foregoing transformation of the space diagram into a time diagram is a valid step because given an equation $$y = f(x)$$

multiplying or dividing both sides by the same quantity does not destroy its validity. Thus $$my = mf(x)$$

also $$y/m = \frac{fx}{m}$$

In the foregoing diagrams the velocity is a function of time, i. e., $$v = f(t)$$

Frequent practice in seismographic exploration by the reflection method is to assume a velocity function of the form:

$$v \text{ (average)} = v_0 + at$$

where $v_0$ and $a$ are determined experimentally in the area being explored. For example, a detector may be lowered into a bore hole to different depths. Shots are fired at or near the surface. The wave transit time from the shot point to the detector at each depth is measured and from the information so obtained the velocity function is determined. In the foregoing equation $v_0$ is the velocity in feet per second at zero time after the shot and $t$ is the time in seconds required for a wave to travel from the shot point to the reflecting horizon and back to the surface of the earth.

However, it is contemplated that the velocity function may be any other functional form, the only limitation being that it is a single valued and positive function of time and that a derivative exists at all points.

In the coastal areas $v_0$ is usually about a lower limit of 5000 feet per second while $(a)$ has a value of approximately 1000. Substituting these values in the velocity function, the equation becomes $$v \text{ (average)} = 5000 + 1000 \, t$$

In the space diagram of Figure II, taking the case where the angle $\theta$ is 90 degrees;

$$L_1^2 = L_0^2 + d_1^2$$

Therefore $L_1 = \sqrt{L_0^2 + d_1^2}$
Also $L_0 = vt_0$ and $t = L/v$
While $$\Delta t = \frac{L_1 - L_0}{v}$$

and $d_1$ is assumed to be 500 feet.

Using the space diagram, $\Delta t$ can thus be determined from the space diagram as in the following examples where $t$ is taken as 0, 1 and 2 seconds, respectively:

Table I

| $t$ | 0 | 1 | 2 |
|---|---|---|---|
| $v$ | 5,000 | 6,000 | 7,000 |
| $L_0$ | 0 | 6,000 | 14,000 |
| $d_1$ | 500 | 500 | 500 |
| $L_0^2$ | 0 | $36 \times 10^6$ | $196 \times 10^6$ |
| $d_1^2$ | $25 \times 10^4$ | $25 \times 10^4$ | $25 \times 10^4$ |
| $L_0^2 + d_1^2$ | $25 \times 10^4$ | $3,625 \times 10^4$ | $19,625 \times 10^4$ |
| $\sqrt{L_0^2 + d_1^2}$ (or $L_1$) | 500 | 6,020.797 | 14,008.925 |
| $L_1 - L_0$ | 500 | 20.797 | 8.925 |
| $\frac{L_1 - L_0}{v}$ or $\Delta t$ | 0.10000 | 0.00347 | 0.00128 |

It will be noted from this table that the function $L = vt$ is a non-linear function.

In a similar manner $\Delta t$ can be determined from the time diagram of Figure III as shown in Table II below where the same values for $t$ have been taken. If the angle $\theta$ be taken as 90 degrees, then $$\frac{L_1^2}{v^2} = \frac{L_0^2}{v^2} + \frac{d_1^2}{v^2}$$

Table II

| $t$ | 0 | 1 | 2 |
|---|---|---|---|
| $v$ | 5,000 | 6,000 | 7,000 |
| $\frac{L_0}{v}$ | 0 | 1 | 2 |
| $\frac{d_1}{v}$ | 0.100 | 0.08333 | 0.07143 |
| $L_0^2$ | 0 | 1 | 4 |
| $\left(\frac{d_1}{v}\right)^2$ | 0.01000 | 0.00694 | 0.00510 |
| $\left(\frac{L_0}{v}\right)^2 + \left(\frac{d_1}{v}\right)^2$ | 0.01000 | 1.00694 | 4.00510 |
| $\frac{L_1}{v}$ | 0.1000 | 1.003464 | 2.001275 |
| $\Delta t = \frac{L_1}{v} - \frac{L_0}{v}$ | 0.10000 | 0.00347 | 0.00128 |

Accordingly, it follows that transforming the space diagram into a time diagram in the manner described provides a valid method of determining $\Delta t$ the phase-time difference. From Table III it is seen that for the conditions specified, a trace recorded at a distance of 500 feet from the shot point with a reflection time 1 second would lag the trace recorded at the shot point by 0.00347 second. With a reflection time of 2 seconds, it would lag the trace recorded at the shot point by 0.00128 second. In other words, $\Delta t$ becomes progressively but nonlinearly smaller along the axis of the strip member as time after the instant of shot increases.

The mechanism of Figure IV is one embodiment of a mechanical apparatus for continuously computing the foregoing time differences, which when linked to a reproducing apparatus will continuously effect the necessary adjustments so as to bring each separate and individual trace into phase time coincidence with a reference trace corresponding to the output of a seismometer located substantially at the shot point.

As indicated in Figure IV, this apparatus consists of a vertical frame or arm 21 mounted above the scanner shown in Figure V which contains the movable pickups or slits. A second frame or arm 22 is suspended within the vertical frame and can be pivoted or rotated about the axis 23. If desired, the frame 21 can be pivoted about this axis. Both frames may be referred to as director arms. Movable member 24 is made to slide along the frame 22 and is driven by a motor 30 through a suitable drive mechanism. Another movable element 31 is located within the vertical frame 21 and is driven through a suitable mechanism by a motor 35. A linkage member or system of levers, advantageously in the form of a pantograph, connected at one end to the base element along the axis 23 and at the other end to the moving element 31 causes the point $g$ to be moved in a line normal to the axis 23 as the element 31 is moved. A cable $abcdeghi$ of constant length is connected from the top of the pickup 36 through a hole in the base point at $b$ along $cde$ of the pantograph links to the moving point $g$, thence through a hole $h$ in the moving element 24 to a fixed point $i$ at the far end of the frame 22.

There are similar cables, one for each trace on the strip member, so connecting each of the pickup elements to the end of the frame 22. Each of the cables passes through the moving element 24 which represents the image point in the space and time diagrams of Figures II and III, respectively. The terminus of the cable is at the fixed point $i$ and is at a relatively great distance from the axis 23, which axis represents the surface of the ground. The extent of movement of the member 24 from the axis 23 is governed by the length of the trace it is desired to reproduce.

The vertical distance $gb$ will be different for each cable, however, since this distance $gb$ corresponds to the $$\frac{d}{v}$$

in Figure III. In the case of the shot point, this distance $gb$ is 0, i. e., the short point is located on the base element at the axis 23. The point $g$ is the effective detector position. The distance increases for each of the pick-up points until a maximum distance is reached at the point representing the most remote detector from the shot point.

The reflecting horizon is, at any instant, midway between the shot point $b$ and the image point element 24.

A scale is provided so that a pointer 37 will indicate the angle of inclination of the movable frame 22. The angle at which this frame rests changes the amount of movement obtained at the pickup for identical movements of the elements 24 and 31.

The operation of the apparatus may be described briefly as follows: In starting out, the movable element 24 is as close to the axis 23 as possible. The member 31 is set at a height such as to cause the last trace pantograph to have its point $g$ at a distance which is $$\frac{d}{v_a}$$

for the most distant trace relative to the shot point, multiplied by a factor which takes into account the original speed of recording in the field and the optical magnification, if any, in the scanning mechanism. For example, if the recording speed is three inches of strip member per second and the optical magnification is $7\times$, then this factor would be 21.

The frame 22 is set at some predetermined angle relative to the vertical frame 21, for example, 80° or 100° of inclination, this latter adjustment being for the purpose of correcting for the inclination of the reflecting horizon as will be discussed later.

The movable element 24 is started in its movement outward in the frame 22 by motor 30. At the same instant motor 35 begins to drive the movable element 31 downward in the vertical frame 21. The movement of element 24 corresponds to the time function of the sound wave as it moves downward in the earth. The movement of the element 31 corresponds to the changes in the factor $$\frac{d}{v}$$

as a function of time where $v$ is the average velocity.

The speed of motors 35 and 30 is controlled to give the desired time relationships. The speed of the motor 30 is constant and provides the linear time function $t$. The motor 35 is indicated schematically as a servo mechanism, or the motor is coupled with a suitable linkage so that it is capable of injecting an inverse function of $v$.

The normal $\Delta t$ of a record will be modified by the presence of dip in the reflecting beds, and in order to adjust for phase-time coincidence it will be necessary to adjust the angle of the director frame 22 with respect to frame 21, making records at different angle settings, varying, for example, from $+30°$ to $-30°$ in 10 degree increments. Then the reproduced record is selected which most nearly aligns a particular record under study.

Correction of velocity function to take into account decreased absolute depth of the reflecting horizon in the presence of moderate or high angles of dip of the reflecting bed, can be accomplished in the case where it is assumed that $v = v_0 + at$, by changing to the form $$v = v_0 + a \cos \alpha t$$

where $\alpha$ is the assumed angle of the reflecting bed.

Thus, the motor 35 and its associated mechanism, when in operation, introduces into the mechanical analysis the non-linear $$\frac{d_1}{v}$$

function which is indicated in the fourth line of Table II. The linear $L_0/v$ function referred to in Table II is introduced by the lateral movement of the image point itself while the sliding ring effect of the moving element 24 upon the cables effects the subtraction of the last line of Table II.

The function $$\frac{d_1}{v}$$

on the time diagram of Figure III shows that the point $g$, representing the detector, must move as velocity changes. In other words, the distance between points $g$ and $b$ varies inversely as the velocity.

Accordingly, the net effect of these movements of the two movable elements 24 and 31 is to lower the position of the slit or pickup since the cable $abcdeghi$ is of constant length.

The portion $g$—$h$ of any cable corresponds to a given reflection ray $$\frac{L}{v_t}$$

at any instant while the portion $g$—$b$ corresponds to $$\frac{d}{v_t}$$

at any instant. The portion $b$—$h$ corresponds to $$\frac{L_0}{v_t}$$

which is the same as $t$ (time).

As indicated in Figure IIIA, if all cables are of equal length $t_T + k$, then, $$t_T + k = t_T - t_0 + t_1 + k - s_1$$

which upon simplification becomes:

$$s_1 = t_1 - t_0 = \Delta t_1$$

Also, $$t_T + k = t_T - t_0 + t_n + k - s_n$$

which upon simplification becomes:

$$s_n = t_n - t_0 = \Delta t_n$$

In Figure IIIA the vertical portions of the cable from $i$ to $h$ represent the corresponding portions of the cables on the director arm 22 of Figure IV extending from $i$ to the sliding element 24. The portion of cable #$n$ (corresponding to any detector $n$) on the director arm from $h$ to $g$ (Figure IV) is equal to $t_0$ in Figure IIIA plus the value of $\Delta t_n$.

The value "$a$" in the term $$\frac{a}{v}$$

as used in Figure IIIA, represents the distance between each of the equally spaced detectors 1, 2 and 3, the first of which is taken as some distance D from the shot point. Thus the detector #2 of Figure IIIA is a distance $$d_2 = (D + a)$$

from the shot point. In this respect, therefore, the diagram of Figure IIIA is analogous to that of Figure III except that in Figure IIIA the angle $\theta$ has been taken as 90°.

As previously indicated there is a separate pantograph linkage for each cable and, therefore, for each trace. It is characteristic of a pantograph that the ratio of the distance from its fixed point ($b$ in Figure IV) to any intermediate moving point $g$ to the distance between its fixed point and the most remote moving point $f$ is a constant. Therefore, linkages for the respective traces can be proportioned to correspond to the distance of each trace from the shot point.

In case of phonographic or magnetic strip members the pick-up points would operate directly on the strip member. But in the case of a photographic strip member, it is possible to operate either directly at the strip member or on a projected image thereof. It is generally advantageous to operate on an optically enlarged projection of the film so as to permit a greater degree of tolerance in mechanical construction. In such case, it will be necessary to adjust the degree of pick-up movement to conform to the time scale of the original strip member or to the equivalent time scale of the projected image which correction must be taken into account in designing the computing mechanism.

In order to correct for weathering, elevation and instrumental delay, provision, not shown in the drawing, is made for adjusting the length of the cables. This is advantageously done by taking up or slacking off at the point $i$, or in the rod which operates the pick-up.

The purpose of passing the cable along the points $edc$ as well as the points $g$ and $b$ of the pantograph linkage is to limit the extent of movement of the pick-up point so as to correspond to the actual movement of the cable through the eyelet at $g$. A possible alternative to passing the cable through these points of the pantograph linkage would be to (1) wind the cable on a spring-loaded drum at a point $g$ to which the cable would be attached, or (2) pass the cable over a drum or pulley with tension maintained by a weight, and then transfer the drum or pulley motion by means of a flexible shaft, for example, coupled to the pick-up displacing means. Instead of this shaft an auto synchronous generator-motor system, sometimes called a repeater system, may be used.

In the practice of this invention it is not necessary that the reference point be taken at the shot point. It may be any other convenient point and might preferably be a point coincident with one of the seismometers whose output is recorded.

Translation of the reference point is achieved by subtracting $\Delta t$ of the new reference point, as computed with the shot point as a reference, from the values of $\Delta t$ for all other traces (also computed with the shot point as a reference).

This may be stated in equation form as follows:

$$\Delta_m t_n = \Delta_0 t_n - \Delta_0 t_m$$
$$\Delta_0 t_n = t_n - t_0$$
$$\Delta_0 t_m = t_m - t_0$$
$$\Delta_m t_n = (t_n - t_0) - (t_m - t_0)$$
$$= t_n - t_0 - t_m + t_0 = t_n - t_m$$

A suitable linkage can be incorporated in the mechanism to perform this operation. It may conveniently be located between points b and a.

The scanner 50 of Figure V through which the strip member 51 bearing the primary record travels lengthwise, is a device for performing the same general function as the scanner described in my aforementioned co-pending application. In the present instance the slits 52A, 52B, 52C and 52D for pick-up are mounted on rod members 36A, 36B, 36C and 36D, respectively. These rod members are slidably supported within the scanning box so that the slits are adjustable along the length of the traces such that their position may be adjusted to correspond to matching peaks on the several traces of the strip member 51.

The upper end of each rod is connected to a cable as was indicated in Figure IV. Advantageously the scanner is mounted below the mechanism of Figure IV so that the rods are in a vertical position and thus can exert tension on their respective cables. If necessary, the rods can be spring-loaded so as to maintain sufficient tension on the cable, or to return the rods to their normal positions when the cables slack off as a result of operation of the moving elements in the director arms of the mechanism of Figure IV.

Numeral 55 designates a light source such that light passes through the juxtaposed film and slits. Advantageously, the film moves between the light source and the slits.

The individual light beams passing through the scanner go into a series of light proof boxes 99, 100, 101, 102 provided respectively with photocells 103, 104, 105, 106. The individual photocells are in turn connected to the input of individual amplifiers 107, 108, 109, 110. These amplifiers may be tuned to pass any particular frequency or band of frequencies by adjustable filters (not shown) but incorporated in the respective amplifier circuits. The outputs of the amplifiers are supplied to a mixer. In the example illustrated by Figure V, one mixer circuit 111 may be employed to combine the output of the amplifiers 107, 108, and a second mixer circuit 112 may be employed to combine the output of amplifiers 109, 110. The outputs of the mixer circuits are fed to a recording camera-type multitrace galvanometer 113 through which a film 114 is passed in synchronization with the passage of the primary film 51 through the scanner. In this way a pair of traces 115, 116 are produced on a secondary record or film 114. The trace 115 is representative of the sum of the individual traces 56 and 57 on the primary record while the other trace 116 represents the addition of the primary traces 58, 59, compensation having been made for phase-time differences.

If desired, the gains of the individual amplifiers between photocells and mixer may be adjusted individually. For example, it may be desirable to add only half the amplitude of one of the original traces to the full amplitude of another.

In the operation of the apparatus the currents from the several seismometers or pick-ups represent the dynamite spectrum as picked up at the several field locations. These wide band compound waves are recorded on the primary film 51 and subsequently subjected to analysis. The analysis involves phase-time compensation employing the scanner, and it may also involve frequency discrimination through the tuning of the amplifier-filter combination. Analysis of the compound waves thus recorded on the primary record may be complete. Thus the primary record may be run through the recording apparatus any number of times with the amplifier-filter combinations of the re-recording apparatus tuned to any particular frequency or frequency band which is to be investigated. The most significant frequencies originally picked up may thus be isolated and investigated either individually or with any desired mixing schedule.

It may be desirable to reverse a given trace in the recording process. This can be accomplished in the apparatus of Figure V with the reversing switches 120, 121, 122, 123 interposed in each case between the individual amplifiers and the mixer. Thus any wave may be reversed (so that its crest becomes its trough) prior to mixing. This may be done to correct for improper field connections, etc.

Mention has been made of detectors 1, 2, 3 and n, etc., by which it is understood that there may be any number of detectors. In certain of the appended claims reference will be made to detectors n and r, for example, arbitrarily selected from a string of detectors extending from the shot point.

Although a specific mechanical apparatus has been described, it will be understood that the invention is not limited to the specific structural mechanism shown and that various modifications thereof may be employed. Electrical means may be employed. For example, an electrical circuit may be employed wherein a voltage output is maintained proportional to the magnitude of $t_n$ (the time required for a reflected sound wave to reach a detector $n$) and a separate voltage output maintained proportional to the magnitude of $t_r$ (the time required for a reflected sound wave to reach a detector $r$), these voltage outputs being placed in series opposing, thereby obtaining a resultant voltage output indicative of the magnitude of the time correction.

This application is a continuation of my copending patent application Serial No. 141,689 filed February 1, 1950.

Obviously many modifications and variations of the invention, as hereinbefore set forth, may be made without departing from the spirit and scope thereof, but only such limitations should be imposed as are indicated in the appended claims.

I claim:

1. In vibration wave analysis of a plurality of traces, the method of continuously determining the amount of time correction required to bring each separate and individual trace into phase-time coincidence with the output of the receptor at the disturbance point, which comprises effecting a continuous mechanical displacement proportional to $t_0$, the time required for a reflected sound wave to reach a receptor substantially at the point of disturbance, effecting a separate continuous mechanical displacement proportional to $t_a$ where $t_a$ is the distance between the disturbance point and another receptor divided by the instaneous value of average velocity, combining said displacements vectorially so as to produce a resultant proportional to the time required for a reflected sound wave to reach said other receptor, and then combining said displacement proportional to $t_0$ and said resultant to produce a scaler difference indicative of the magnitude of said time correction.

2. In a vibration wave analyzer for a plurality of traces on a strip member in reproducible form, said traces being made by the responses of receptors at a plurality of points differently located relative to a common source of disturbance such that there is a phase-time difference between the separate traces, a means for determining the phase-time correction which comprises a first director arm and a second director arm pivoted on a common axis normal to the plane defined by the longitudinal axes of both director arms, said arms being capable of angular displacement with respect to each other, a sliding element movable along the longitudinal axis of each arm, separate means for moving said elements longitudinally along the respective arms in a controlled manner, a cable for each trace, having one end thereof adjustably attached at one end of said first arm, said cable passing through an eyelet in the element movable along the first arm, then through another eyelet mounted on a linkage connected between the element movable on the second arm and the aforesaid common axis, means in communication with the moving end of said cable for maintaining substantially uniform tension thereon, and means for transferring to a displacing mechanism movement proportional to the length of cable passing through the linkage eyelet.

3. Apparatus according to claim 2 in which the means for transferring movement proportional to the length of cable passing through said eyelet comprises a pantographic linkage.

4. Apparatus according to claim 3 in which means are provided for moving the sliding element along the first director arm at a constant rate of speed and separate means are provided for moving the other sliding element along the second director arm at variable speed.

5. A vibration wave analyzer for a plurality of traces on a strip member in reproducible form, said traces being made by the responses of receptors at a plurality of points differently located relative to a common source of disturbance such that there is a phase-time difference between the separate traces, comprising a scanner containing a pickup element for each trace on the strip member and responsive to variations in said trace, means for continuously determining the amount of time correction required to bring each separate and individual trace into phase-time coincidence with a reference trace corresponding to the output of a receptor located at a selected point with reference to the point of disturbance, said means for determining the phase-time correction comprising a first director arm and a second director arm pivoted on a common axis normal to the plane defined by the longitudinal axes of both director arms, said arms being capable of angular displacement with respect to each other, a sliding element movable along the longitudinal axis of each arm, separate means for moving said elements longitudinally along the respective arms in a controlled manner, a cable for each trace, having one end thereof adjustably attached at one end of said first arm, said cable passing through an eyelet in the element movable along the first arm, then through another eyelet mounted on a linkage connected between the element movable on the second arm and the aforesaid common axis, and means in communication with the moving end of said cable for maintaining substantially uniform tension thereon, means operatively connected to the aforesaid time correction means, for continuously displacing each individual pickup along the time axis of the strip member by said amount of time correction and means for reproducing the record with the displaced pickups.

References Cited in the file of this patent

UNITED STATES PATENTS

| | | |
|---|---|---|
| 2,243,730 | Ellis | May 27, 1941 |
| 2,440,971 | Palmer | May 4, 1948 |
| 2,578,133 | Hawkins | Dec. 11, 1951 |
| 2,692,377 | Brettell | Oct. 19, 1954 |